(12) United States Patent
Inoue et al.

(10) Patent No.: US 6,416,728 B2
(45) Date of Patent: Jul. 9, 2002

(54) METHOD FOR PRODUCING IRON CARBIDE

(75) Inventors: Eiji Inoue; Torakatsu Miyashita, both of Kobe; Yoshio Uchiyama, Akashi; Junya Nakatani, Kobe; Teruyuki Nakazawa, Koganei; Akio Nio, Kiyose, all of (JP)

(73) Assignees: Kawasaki Jukogyo Kabushiki Kaisha, Hyogo; Mitsubishi Corporation, Tokyo, both of (JP)

( * ) Notice: Subject to any disclaimer, the term of this patent is extended or adjusted under 35 U.S.C. 154(b) by 0 days.

(21) Appl. No.: 09/367,300

(22) PCT Filed: Feb. 25, 1998

(86) PCT No.: PCT/JP98/00789

§ 371 (c)(1), (2), (4) Date: Aug. 10, 1999

(87) PCT Pub. No.: WO98/38342

PCT Pub. Date: Sep. 3, 1998

(30) Foreign Application Priority Data

Feb. 28, 1997 (JP) .............................. 9-045701

(51) Int. Cl.$^7$ ............................. C01B 31/30
(52) U.S. Cl. .................................... 423/439
(58) Field of Search .................................. 423/439, 138

(56) References Cited

U.S. PATENT DOCUMENTS 5,837,031 A * 11/1998 Miyashita et al. ............ 75/505

FOREIGN PATENT DOCUMENTS

| JP | 8-245212 | 9/1996 |
| JP | 9-48604 | 2/1997 |

* cited by examiner

Primary Examiner—Steven P. Griffin
Assistant Examiner—Eileen E. Nave
(74) Attorney, Agent, or Firm—Oppenheimer Wolff & Donnelly LLP

(57) ABSTRACT

Provided is a method for producing iron carbide in which free carbon is generated with difficulty. When iron carbide is produced by reducing and carburizing iron-containing raw materials for iron making using a reaction gas mainly containing hydrogen and methane, steam or carbon dioxide is added into fluidized bed reactor (1) through line (7) in addition to the reaction gas supplied from line (2) into reactor (1) corresponding to a quantity of free carbon generated in reactor (1) which is obtained by means of dust meter (9). Consequently, the generation of the free carbon can be controlled.

1 Claim, 5 Drawing Sheets

METHOD FOR PRODUCING IRON CARBIDE

TECHNICAL FIELD

The present invention relates to a method for producing iron carbide ($Fe_3C$) suitable for raw materials for iron making or steel making which comprises iron carbide ($Fe_3C$) as a main component, for example, raw materials for steel making which is used in an electric furnace and the like.

BACKGROUND ART

The production of steel normally comprises the steps of converting iron ore into pig iron using a blast furnace, and then converting the pig iron into steel using an open hearth furnace or a converter. Such a traditional method requires large amounts of energy and large-scale equipment, and has a high cost. Therefore, for a small-scale steel making, a method comprising the steps of directly converting iron ore into raw materials to be used in a steel making furnace, and converting the raw materials into steel using an electric furnace and the like has been used. With respect to this direct steel making process, a direct reduction process has been used to convert iron ore into reduced iron. However, the reduced iron produced by the direct reduction process is highly reactive and reacts with oxygen in the air to generate heat. Therefore, it is necessary to seal the reduced iron with an inert gas or by some other measures during transportation and storage of the reduced iron. Accordingly, iron carbide ($Fe_3C$) containing a comparatively high iron (Fe) content, and which has a low reaction activity and can be easily transported and stored, has recently been used as the raw materials for steel making in an electric furnace and the like.

Furthermore, raw materials for iron making or steel making containing iron carbide as a main component is not only easy to be transported and stored, but also has the advantage that carbon element combined with iron element can be used as a source of fuel in an iron making or steel making furnace, and can be used as a source to generate microbubbles which accelerates a reaction in the steel making furnace. Therefore, raw materials for iron making or steel making containing iron carbide as a main component has recently attracted special interest.

According to a conventional method for producing iron carbide, iron ore fines are fed into a fluidized bed reactor or the like, and are caused to react with a gas mixture comprising a reducing gas (e.g., hydrogen gas) and a carburizing gas (e.g., a methane gas and the like) at a predetermined temperature. Thus, iron oxides (hematite ($Fe_2O_3$), magnetite ($Fe_3O_4$), wustite (FeO)) contained in iron ore are reduced and carburized in a single process (which means a process performed by simultaneously introducing a reducing gas and a carburizing gas into a single reactor) as shown in the following reaction formula ((1), (2), (3), (4)).

$$3Fe_2O_3 + H_2 \rightarrow 2Fe_3O_4 + H_2O \tag{1}$$

$$Fe_3O_4 + H_2 \rightarrow 3FeO + H_2O \tag{2}$$

$$FeO + H_2 \rightarrow Fe + H_2O \tag{3}$$

$$3Fe + CH_4 \rightarrow Fe_3C + 2H_2 \tag{4}$$

Furthermore, the formula (1) to (3) may be put together. As a result, the reaction formula for deciding the progress of reduction and carburization of iron oxide can be shown by the following reaction formula (5) and the above-mentioned reaction formula (4).

$$Fe_2O_3 + 3H_2 \rightarrow 2Fe + 3H_2O \tag{5}$$

The prior art related to the field of the present invention has been described in the publication No. 6-501983 of Japanese Translation of International Patent Application (PCT/US91/05198), for example.

However, free carbon is sometimes generated depending on the producing conditions such as a gas composition, a reaction temperature and the like in a fluidized bed reactor. In a case where the free carbon is mixed with iron carbide, there come out the following drawbacks.

(1) There is a possibility that a dust fire or explosion might be caused by free carbon scattered in a gas exhausted from the fluidized bed reactor.

(2) An opening such as an inlet port for raw materials, an outlet port for product of the fluidized bed reactor is sometimes blocked by the free carbon.

(3) $CH_4$ is consumed with the generation of the free carbon. For this reason, $CH_4$ which is necessary for the generation of iron carbide is additionally required.

(4) Once the free carbon is generated, the generation of the free carbon is promoted.

In consideration of the above-mentioned problems of the prior art, it is an object of the present invention to provide a method for producing iron carbide in which free carbon is generated with difficulty.

DISCLOSURE OF THE INVENTION

In order to accomplish the above-mentioned object, the present invention can detect free carbon in a latter half of compartments in a reactor and change a composition of a reaction gas corresponding to a quantity of the detected free carbon, thereby controlling the generation of the free carbon.

More specifically, the present invention provides a method for preventing free carbon from being generated by thermal decomposition from carbon monoxide or hydrocarbon when raw materials for iron making or steel making mainly comprising iron carbide as a main component is produced by reducing and carburizing iron-containing raw materials for iron making mainly comprising iron oxides and iron hydroxides as main components using a reaction gas mainly containing hydrogen and methane, comprising the steps of dividing an inside of a reactor into a plurality of compartments, detecting the free carbon in a latter half of the compartments which are closer to an outlet port for product, and changing a composition of the reaction gas corresponding to a quantity of the detected free carbon.

As a process of detecting free carbon, it is possible to employ "a process of detecting free carbon based on a change of a temperature of a thermometer installed in the latter half of the compartments", "a process of detecting free carbon by analyzing dust picked up by a dust pick-up device installed on an upper portion in the latter half of the compartments" or "a process of detecting free carbon based on a result of detection of a ratio of methane to hydrogen in gas picked up by a gas pick-up device installed on an upper portion in the latter half of the compartments". In addition, these two or more processes can be combined.

As a process of changing the composition of the reaction gas in the reactor, it is possible to employ "a process of increasing steam in the reaction gas corresponding to the quantity of the detected free carbon", "a process of increasing carbon dioxide in the reaction gas corresponding to the quantity of the detected free carbon" or "a process of decreasing the carbon monoxide or the hydrocarbon in the reaction gas corresponding to the quantity of the detected free carbon". In addition, these two or more processes can be combined.

The above-mentioned change of the composition of the reaction gas can be performed by controlling the composition of the reaction gas to be introduced into the reactor.

The status of the change of iron-containing raw materials in the reactor according to the present invention having the above-mentioned constitution will generally be described. A part of raw materials in the compartments on the side closer to the inlet port for raw materials is converted into Fe by mainly reducing reaction. Then, the residual reducing reaction and the carburizing reaction into iron carbide ($Fe_3C$) of the iron-containing raw materials are performed in the compartments on the side closer to the outlet port for product. If the carburizing reaction in which an upper limit of a ratio of conversion into $Fe_3C$ obtained at a certain $H_2O$ partial pressure is exceeded is carried out, free carbon is generated. By the following process, the free carbon is detected. Then, the composition of the reaction gas is changed by the following process corresponding to the quantity of the detected free carbon. Consequently, the generation of the free carbon can be controlled.

(1) Detection of Free Carbon a. Change of Reaction Temperature

The change of a reaction temperature can be used as means for indirectly detecting the generation of free carbon. The reason is as follows. It is supposed that a temperature in a reactor is generally uniform when reaction steadily progresses in a fluidized bed reactor. However, deposition of the free carbon which is caused in the reactor is an endothermic reaction. For this reason, a temperature is dropped in a portion where the free carbon is deposited. Therefore, thermometers are installed in a portion where the free carbon is easily deposited (a portion closer to the outlet port for product of the reactor) and other portions in the reactor where the free carbon is deposited with difficulty, and their measuring temperatures are compared with one another. If it is apparent that the temperature in the portion closer to the outlet port for product is clearly lower than the temperatures in the other portions, it is possible to decide that the free carbon is deposited.

b. Analysis of Dust

By analyzing dust picked up by means of the dust pick-up device, the free carbon can be directly detected.

c. Analysis of Gas Composition

As described above, the free carbon is generated when the ratio of conversion of Fe into $Fe_3C$ has become equal to or greater than a constant value. In other words, if a ratio of $CH_4/H_2$ in the gas composition is raised to a constant value or more as shown by the above-mentioned reaction formula (4), there is a higher possibility that the free carbon might be generated. Accordingly, the gas composition in the latter half of the compartments of the reactor is analyzed, and the generation of the free carbon can be indirectly detected if a value of $CH_4/H_2$ in the above gas has been rapidly reduced.

d. Combination of Detecting Process

If two or more of "change of reaction temperature", "analysis of dust" and "analysis of gas composition" are combined, the free carbon can be detected more rapidly.

(2) Change of Reaction Gas Composition a. Addition of Steam ($H_2O$)

It is not preferable that a ratio of conversion from iron-containing raw materials into iron carbide be low (equal to or lower than about 90%). The reason is that the grade of the iron carbide having the low conversion ratio is too low to be used as raw materials for iron making or steel making. On the other hand, if the ratio of conversion from iron-containing raw materials into iron carbide is too high (equal to or higher than about 99%), free carbon is easily deposited. Therefore, if it is hoped that raw materials for iron making or steel making with high grade is obtained while controlling the generation of the free carbon, it is preferable that the ratio of conversion from iron-containing raw materials into iron carbide should be kept within a constant range.

As described above, it is possible to collectively express, by the following two reaction formula, the reaction where iron carbide ($Fe_3C$) is produced from iron-containing raw materials using a reaction gas mainly containing hydrogen and methane.

$$Fe_2O_3 + 3H_2 \rightarrow 2Fe + 3H_2O \tag{5}$$

$$3Fe + CH_4 \rightarrow Fe_3C + 2H_2 \tag{4}$$

In the last stage of the conversion into $Fe_3C$ (in which most of the iron-containing raw materials are converted into $Fe_3C$), the reaction approaches an equilibrium state. If steam ($H_2O$) is added into a reaction system in the equilibrium state, potentials of hydrogen and oxygen are increased and potentials of iron and carbon are decreased. More specifically, when $H_2O$ is added to the reaction system of the reaction formula (5), a concentration or partial pressure of a molecule on the right side is raised. For this reason, the reaction progresses toward the left side to recover the equilibrium state. In other words, $H_2$ is increased and Fe is decreased. In the reaction formula (4), the reaction progresses toward the left side in order to consume the increase in $H_2$ and to compensate for the decrease in Fe. As a result, it is possible to control excessive conversion from iron-containing raw materials into iron carbide.

Thus, by adding the steam to the reaction gas, the generation of the free carbon can be controlled. In addition, it is possible to obtain raw materials for iron making or steel making with high grade in which a ratio of conversion into iron carbide is kept within a proper range.

b. Addition of Carbon Dioxide ($CO_2$)

In a case where carbon dioxide is added in place of steam, the following reaction progresses.

$$CO_2 + H_2 \rightarrow CO + H_2O \tag{6}$$

More specifically, addition of $CO_2$ is synonymous with that of $H_2O$. By the above-mentioned action, the generation of free carbon can be controlled.

c. Decrease in Quantity of Methane ($CH_4$) to be Supplied

A decrease in the quantity of $CH_4$ to be supplied is equivalent to the progress of the reaction in the reaction formula (4) toward the left side or a delay of the progress of the reaction in the reaction formula (4) toward the right side. As a result, excessive conversion from iron-containing raw materials into iron carbide can be controlled. Consequently, the generation of the free carbon can be controlled. If a quantity of $CH_4$ to be supplied is excessively reduced, the generation of the free carbon can be controlled but a quantity of metallic iron (M—Fe) accumulated in a product is increased. The metallic iron contained in the product gradually reacts with oxygen in the air at an ordinary temperature and is then returned to iron oxide. Accordingly, it is preferable that the quantity of $CH_4$ to be supplied should not be reduced excessively but be reduced to obtain such a gas composition to approach an equilibrium state with a solid at that time. Referring to an equilibrium of the gas composition in Fe—CHO reaction system, in other words, a concentration of $CH_4$ is reduced to approach the equilibrium state in order to correct a carbon potential which is excessively higher than an equilibrium composition of Fe and $Fe_3C$. Consequently, the generation of the free carbon can be controlled.

d. Combination of Processes of Changing Reaction Gas Composition

If two or more of "addition of steam", "addition of carbon dioxide" and "decrease in quantity of methane to be supplied" are combined, the generation of free carbon can be controlled more effectively.

(3) Process of Changing Reaction Gas Composition

By controlling a flow rate of a gas to be exhausted from the reactor, a gas composition in the reactor can be changed. However, if this process is carried out, a gas balance within the reactor is sometimes lost. Therefore, this process is not preferred.

As compared with the foregoing, a process of increasing a steam content of the reaction gas to be introduced into the reactor, adding steam or carbon dioxide to the reaction gas or decreasing a quantity of methane to be supplied can be easily performed directly and has no drawbacks which are caused by the process of controlling the flow rate of the exhaust gas.

(4) Other Processes of Controlling Generation of Free Carbon

Other processes of controlling the generation of free carbon than the above-mentioned processes are as follows.

a. Increase in Quantity of Iron-Containing Material to be Fed and Increase in Quantity of Iron Carbide to be Discharged If the quantity of iron carbide to be discharged is increased, iron carbide in which free carbon is actually deposited is discharged and iron-containing raw materials having a large number of nonreacted components is increased in the vicinity of the outlet port of the reactor. Once the free carbon is deposited, the generation of the free carbon is promoted. Therefore, it is preferable that the deposited free carbon should be discharged quickly. Even if the quantity of iron-containing raw materials to be fed is increased, the same action can be obtained.

b. Feeding Nonreacted Iron-Containing Raw Materials in Stage in Which Reducing Reaction and Carburizing Reaction have Progressed to Constant Extent or More If nonreacted iron-containing raw materials are fed into a portion in which reducing reaction and carburizing reaction have progressed to a constant extent or more and a ratio of conversion into iron carbide is very high (for example, a portion in the vicinity of the outlet port of the reactor), oxygen potential is increased in that portion. Therefore, $H_2O$ is generated and excessive conversion into iron carbide is inhibited in the same manner as the addition of steam. Consequently, the generation of the free carbon can be controlled.

c. Drop in Reaction Temperature

If a temperature is dropped, a reaction speed is reduced so that the generation of the free carbon can be controlled.

(5) Means for Predicting Generation of Free Carbon

The quantity of metallic iron contained in a product can be used as means for predicting the generation of free carbon. The reason is that the ratio of the metallic iron contained in the product is low in the last stage of the reaction, and iron produced by reducing residual iron oxide immediately is liable to be converted into iron carbide. More specifically, very small quantity of metallic iron (or lack of the metallic iron) indicates excessive conversion into iron carbide. If a quantity of the metallic iron contained in the product is known, the generation of the free carbon can be predicted. A specific method for predicting the generation of the free carbon is as follows. A gas composition in the vicinity of the outlet port of the reactor (which has an equilibrium relationship with the product) is known by a gas chromatography method, for example, and the quantity of the metallic iron contained in the product is estimated using the gas composition as a basis. Thus, the generation of the free carbon can be predicted.

According to the present invention described above, the inside of the reactor is divided into a plurality of compartments, free carbon is detected in a latter half of the compartments which are closer to the outlet port for product, and the composition of a reaction gas is changed corresponding to the quantity of the detected free carbon. Thus, the generation of the free carbon can precisely be detected and the generation of the free carbon can be controlled.

By employing the above-mentioned process of detecting the free carbon, the generation of the free carbon can be detected more surely.

Furthermore, the above-mentioned process is employed to change the composition of the reaction gas in the reactor. Consequently, the generation of the free carbon can be controlled ffectively. Therefore, it is possible to eliminate drawbacks such as blocking of the reactor, a dust fire and the like which are caused by the free carbon. In addition, it is possible to produce iron carbide as raw materials for iron making or steel making with high grade to which no carbon sticks. Furthermore, since the generation of the free carbon can be controlled effectively, it is possible to prevent wasteful consumption of carbon monoxide or hydrocarbon which acts as a resource for producing iron carbide.

BEST MODE FOR CARRYING OUT THE INVENTION

First of all, a convention method for producing iron carbide will be described. Next, description will be given to a method for controlling the generation of free carbon when producing iron carbide by reducing and carburizing iron-containing raw materials for iron making according to the method of the present invention.

A. Conventional Method for Producing Iron Carbide

In accordance with a conventional method, description will be given to conditions for conversion of iron ore mainly comprising hematite ($Fe_2O_3$) into iron carbide ($Fe_3C$), the schematic structure of a reactor and results thereof.

(1) Condition

The composition and particle size of iron ore used as raw materials, the composition of a reaction gas, a reaction temperature and a reaction pressure are as follows.

I. Composition of Iron Ore 65.3% by weight of Fe, 1.67% by weight of $Al_2O_3$, 3.02% by weight of $SiO_2$, 0.080% by weight of P II. Particle Size of Iron Ore fines having a particle size of 1.0 mm or less (a particle size of 0.1 mm to 1.0 mm : 80% by weight or more, a particle size of 0.068 mm or less: 13.4% by weight)

III. Composition of Reaction Gas (Percent by Volume)

$CH_4$:35 to 56%, $H_2$:33 to 45%, CO: 2.5 to 10%, $CO_2$:1.2 to 8%, $N_2$:2.8 to 9.2%, $H_2O$ :0.6 to 1.5%, The total is 100%.

| IV. | Reaction temperature | 590° C. to 650° C. |
|---|---|---|
| V. | Reaction pressure | 3 $kgf/cm^2$ G("G" represents a gauge pressure) |

(2) Schematic Structure of Reactor

Figure 1:
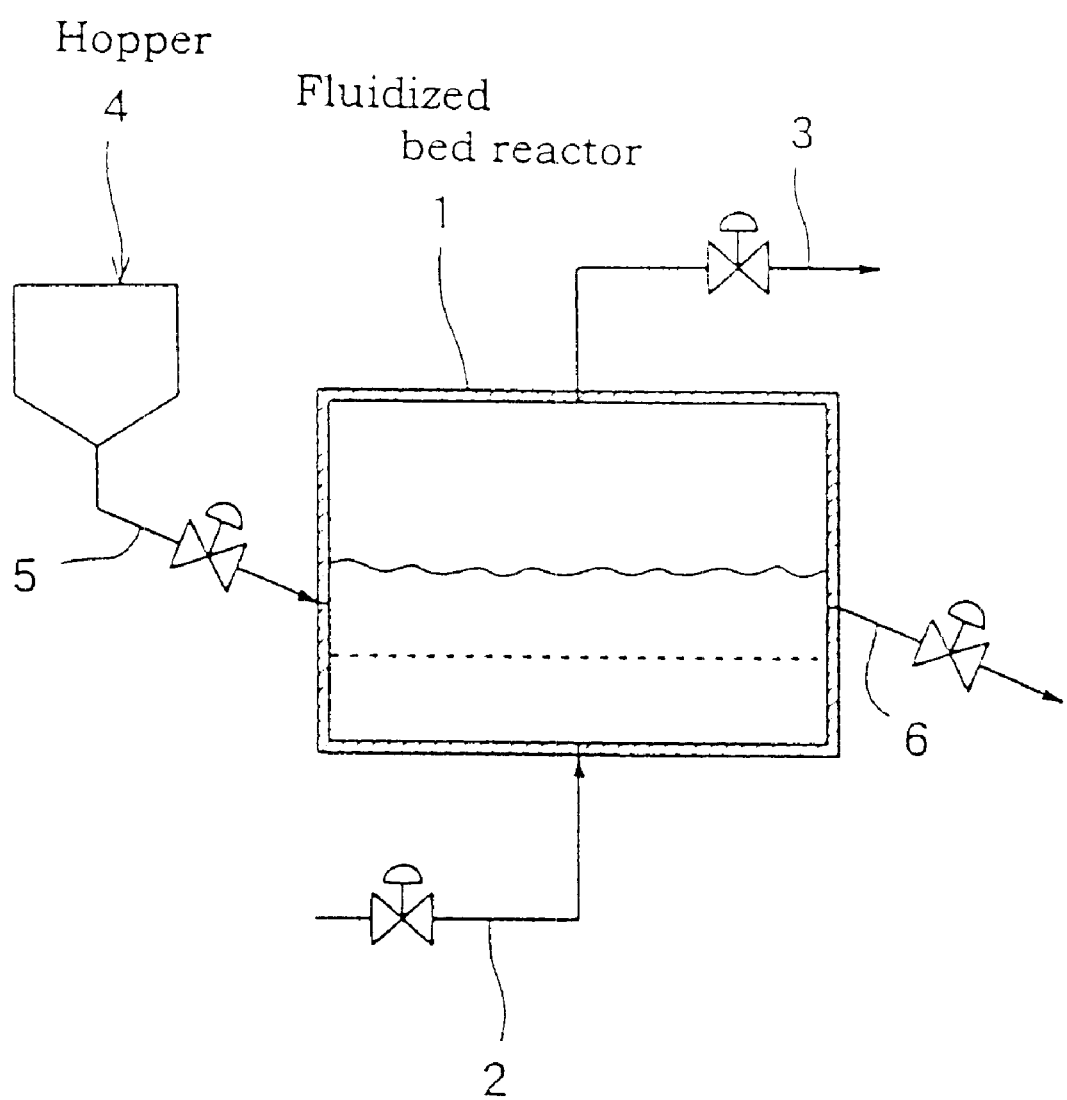
FIG. 1 is a schematic diagram showing an example of an apparatus for producing iron carbide according to the prior art.

As shown in FIG. 1, line 2 for supplying a reaction gas is connected to a bottom part of fluidized bed reactor 1, and line 3 for exhausting the reaction gas is connected to a top part of the reactor 1. Iron ore is fed into fluidized bed reactor 1 from hopper 4 through line 5, and iron carbide product is discharged from line 6.

(3) Result

Figure 2:
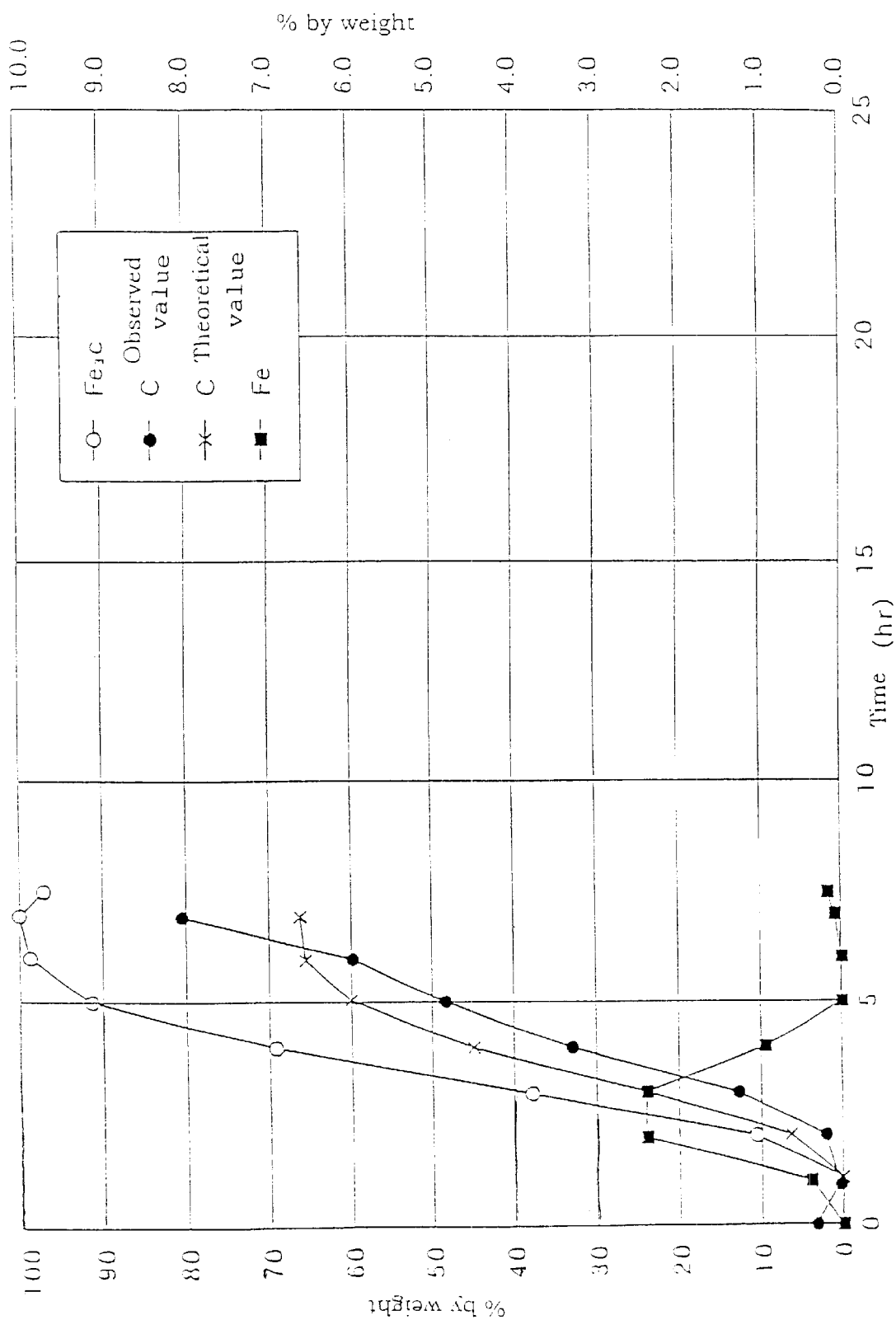
FIG. 2 is a chart representing a transition of each of weight ratios of iron carbide ($Fe_3C$), iron (Fe) and carbon (C) (observed values and theoretical values) in a product which is obtained in the case where iron carbide is produced by reducing and carburizing iron-containing raw materials for iron making.

By the above-mentioned conditions, iron carbide was produced using the reactor shown in FIG. 1. As a result, iron ore was converted into iron carbide ($Fe_3C$) with a transition as shown in FIG. 2. In FIG. 2, an ordinate on the left side represents percent by weight of Fe and $Fe_3C$, an ordinate on the right side represents percent by weight of an observed value and a theoretical value of carbon, and an abscissa represents a reaction time (hr). As is apparent from FIG. 2, a time taken for obtaining a ratio of conversion into 93% by weight or more of iron carbide which is preferable for raw materials for iron making or steel making was about 6 hours.

As shown in FIG. 2, while the weight ratio of carbon had a theoretical value of about 6.6% by weight in case of a ratio of conversion into iron carbide of 100%, an observed value of 8% by weight was obtained. It is supposed that a difference of "1.4% by weight" was caused by free carbon.

B. Method for Producing Iron Carbide According to the Present Invention

Description will be given to the schematic structure of a reactor which is suitable for carrying out the method of the present invention and the result of investigations related to effects of reaction conditions which are exerted on the generation of free carbon.

(1) Schematic Structure of Reactor

I. Addition of Steam ($H_2O$) or Carbon Dioxide ($CO_2$) to Reaction Gas

Figure 3:
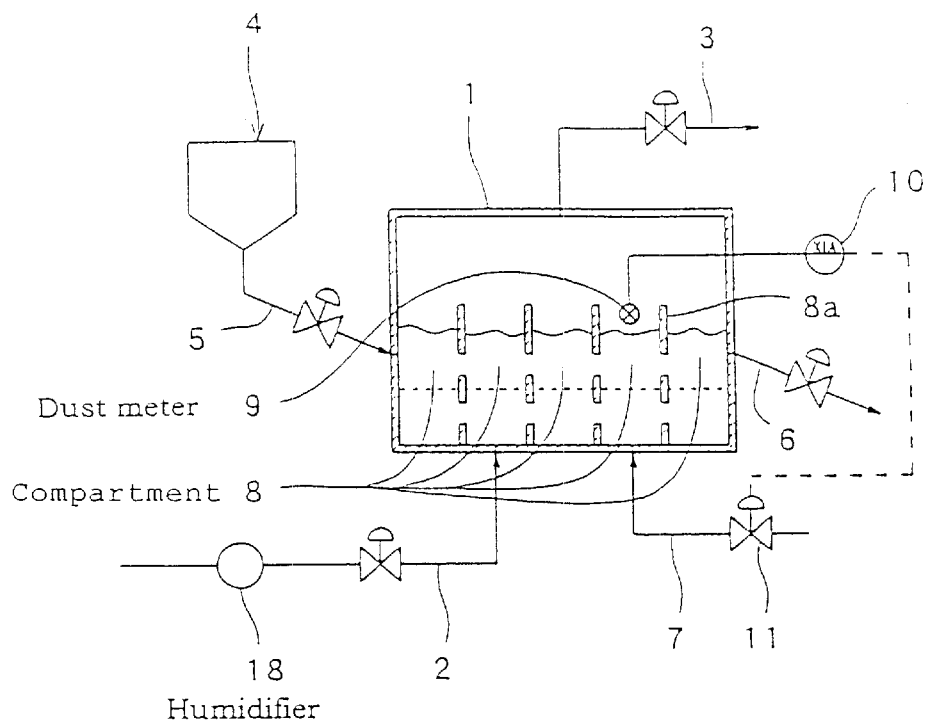
FIG. 3 is a schematic diagram showing an example of an apparatus for producing iron carbide according to the present invention.

As shown in FIG. 3, line 7 for supplying $H_2O$ or $CO_2$ is connected to a bottom part of fluidized bed reactor 1. An opening of valve 11 is regulated by means of indicator 10 according to a quantity of free carbon detected by dust meter 9 for detecting free carbon which is installed on an upper portion in a latter half of five compartments 8 in the reactor 1 partitioned by partition wall 8a that is closer to an outlet port for product. Thus, a proper quantity of $H_2O$ or $CO_2$ is supplied into fluidized bed reactor 1. The operation of increasing water content in line 2 for supplying the reaction gas is performed by means of humidifier 18. Alternatively, line 7 is connected to the latter half of the compartments of the reactor in which free carbon is easily generated. Thus, a small quantity of $H_2O$ or $CO_2$ is supplied to reactor 1 through line 7.

As a result, the generation of the free carbon can be controlled by the above-mentioned mechanism.

II. Decrease in Quantity of Methane to be Supplied to Reaction Gas

Figure 4:
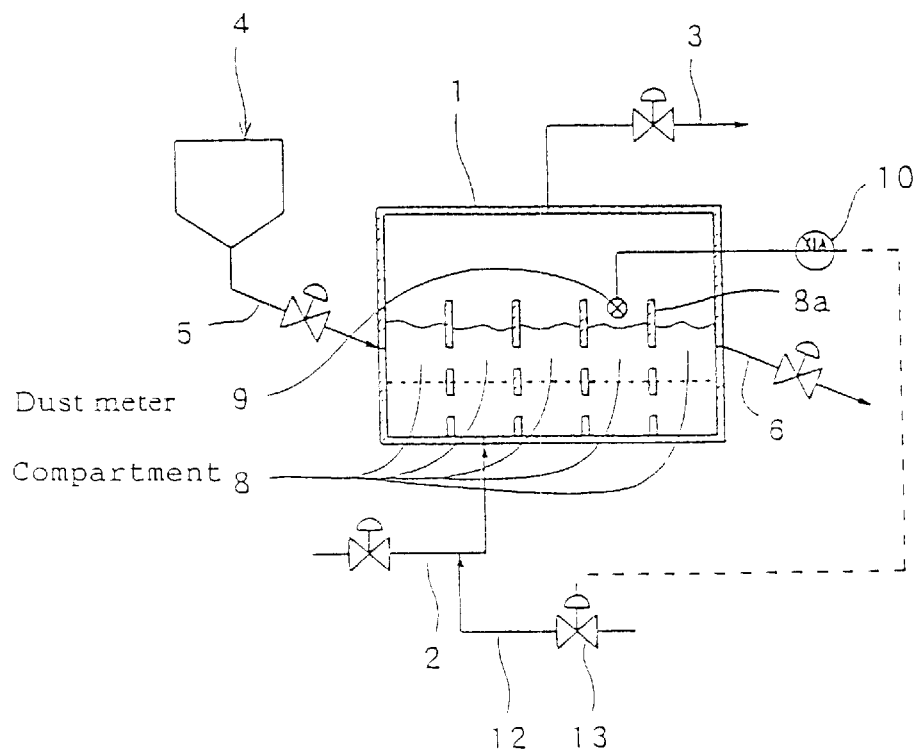
FIG. 4 is a schematic diagram showing another example of the apparatus for producing iron carbide according to the present invention.

As shown in FIG. 4, line 12 for supplying natural gas is connected to line 2 for supplying the reaction gas to the bottom part of fluidized bed reactor 1. An opening of valve 13 is regulated by means of indicator 10 according to a quantity of free carbon which is detected by dust meter 9. Thus, a flow rate of the natural gas to be supplied from line 12 to line 2 is regulated. Natural gas is a lower paraffin based hydrocarbon ($C_nH_{2n+2}$) containing methane as a main component and necessary for carburizing reaction. In order to promote the carburization, the natural gas is added to the reaction gas in line 2 if necessary. If the free carbon is generated in fluidized bed reactor 1, the opening of valve 13 is regulated to reduce the quantity of the natural gas to be supplied into reactor 1. Thus, the generation of the free carbon is controlled. In this case, a line (not shown) for supplying hydrogen may be connected to line 2, and hydrogen may be supplied from the hydrogen supply line to line 2 according to the quantity of the free carbon which has been detected by dust meter 9. Thus, a concentration of methane contained in the reaction gas is relatively reduced. Consequently, the generation of the free carbon can be controlled.

In place of the above-mentioned dust meter 9, a gas pick-up device may be installed. A ratio of methane to hydrogen in the gas picked up by the gas pick-up device may be detected by a gas chromatography method or the like. If the ratio of methane has been rapidly reduced, the generation of the free carbon can be predicted.

III. Drop in Reaction Temperature in Fluidized Bed Reactor

Figure 5:
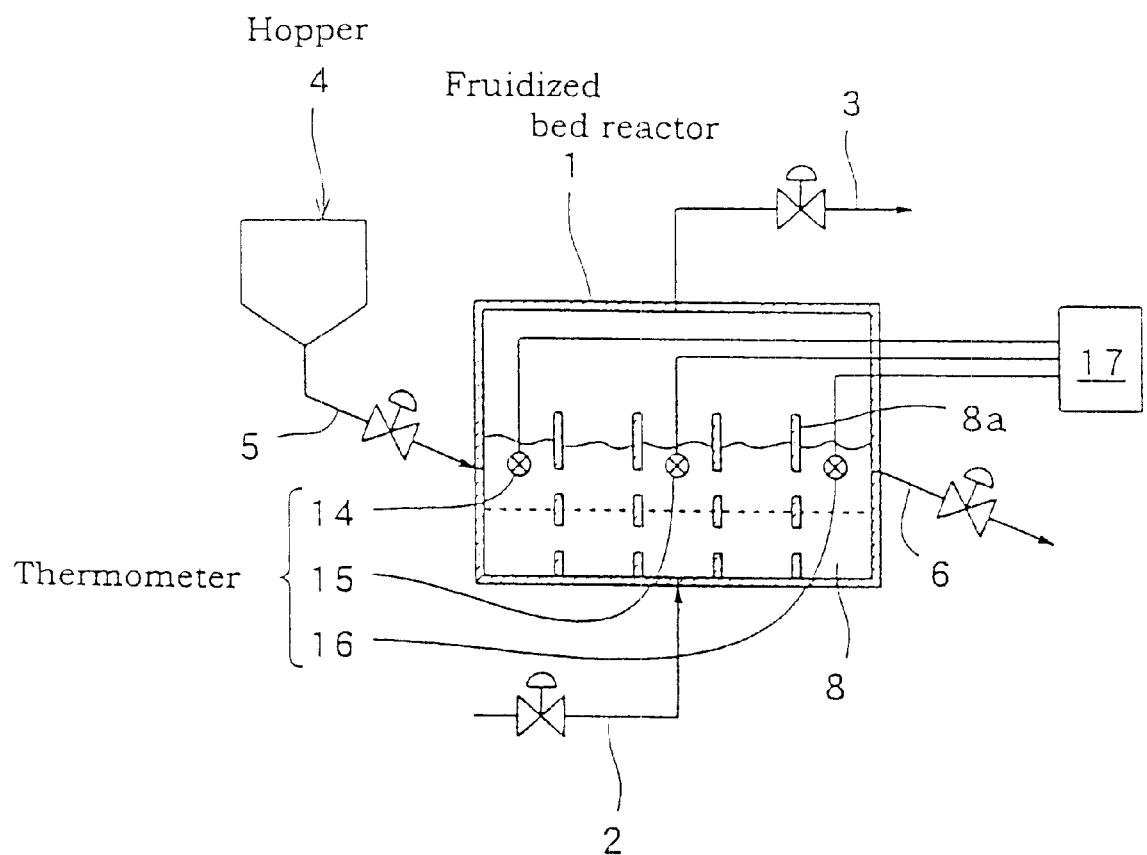
FIG. 5 is a schematic diagram showing yet another example of the apparatus for producing iron carbide according to the present invention.

If a reaction temperature is dropped, a reaction speed is relatively reduced so that the generation of free carbon can be controlled. For example, as shown in FIG. 5, thermometers 14, 15 and 16 are inserted into the compartments in the vicinity of an inlet port for iron ore, a central portion and the vicinity of an outlet port for product of fluidized bed reactor 1, respectively. Thus, the temperatures are monitored by means of instrument 17. In a case where a reaction in fluidized bed reactor 1 progresses in a steady state, the temperatures measured by the thermometers 14, 15 and 16 are almost equal to one another. However, in a case where free carbon has been generated in reactor 1, the temperature in that portion is lower than the temperatures in other portions because the generation of the free carbon is endothermic reaction. In general, iron ore has a high ratio of conversion into iron carbide in the vicinity of the outlet port for product. In this portion, free carbon is easily generated. By comparing the temperature measured by thermometer 16 with the temperatures in other portions, the generation of the free carbon can be indirectly known. For example, if a temperature $T_0$ measured by thermometer 16 is lower than each of temperatures $T_{1a}$ and $T_{2a}$ measured by thermometers 14 and 15 by a temperature of 30 to 50° C., it is supposed that the free carbon has been generated. If the operation is carried out in such a manner that each of temperatures $T_{1b}$ and $T_{2b}$ measured by thermometers 14 and 15 is lower than each of the temperatures $T_{1a}$ and $T_{2a}$ in order to make a conversion ratio into iron carbide less than the conversion ratio based on the conditions in fluidized bed reactor 1 (the temperatures $T_{1a}$, $T_{2a}$ $T_0$ and the ratio of conversion into iron carbide) at that time, the generation of free carbon can be controlled.

(2) Effect of Reaction Condition Exerted on Generation of Free Carbon

I. Effect of Steam ($H_2O$)

Figure 6:
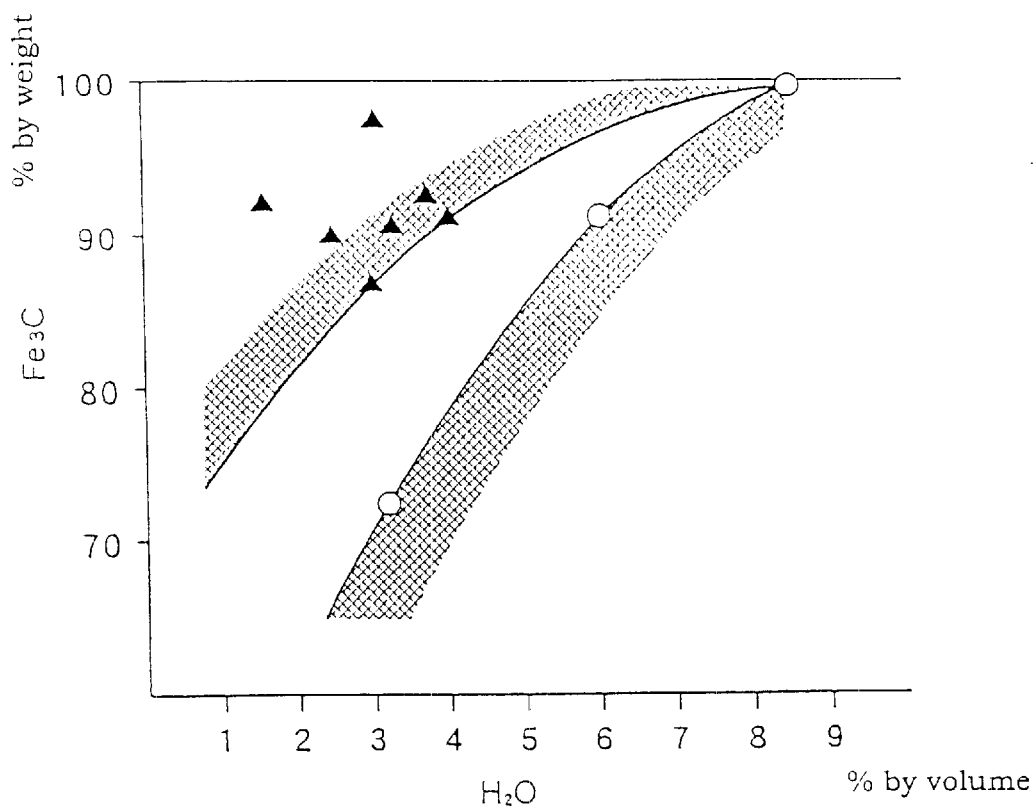
FIG. 6 is a chart representing a relationship between precent by volume of $H_2O$ in a fluidized bed reactor and percent by weight of $Fe_3C$ in a product, which is exerted on the generation of free carbon.

FIG. 6 is a chart representing the effect of percent by volume of $H_2O$ which is exerted on the generation of free carbon in the case where iron ore having the above-mentioned composition and particle size has been converted into iron carbide ($Fe_3C$) using a reaction gas having the above-mentioned composition at a temperature of 590 to 650° C. and a pressure of 3 to 4 $kgf/cm^2$ G in the fluidized bed reactor 1. In FIG. 6, mark 'O' indicates a case where the free carbon has been not generated, and mark '▲' indicates a case where the free carbon has been generated. As is apparent from FIG. 6, if percent by volume of $H_2O$ is increased, a region where the free carbon is not generated (a right region of a line connecting marks 'O' in FIG. 6 is the region where the free carbon is not generated) is increased. More specifically, if steam is added, the free carbon is generated with difficulty even if the ratio of conversion into the iron carbide has been increased.

II. Influence of Metallic Iron

Figure 7:
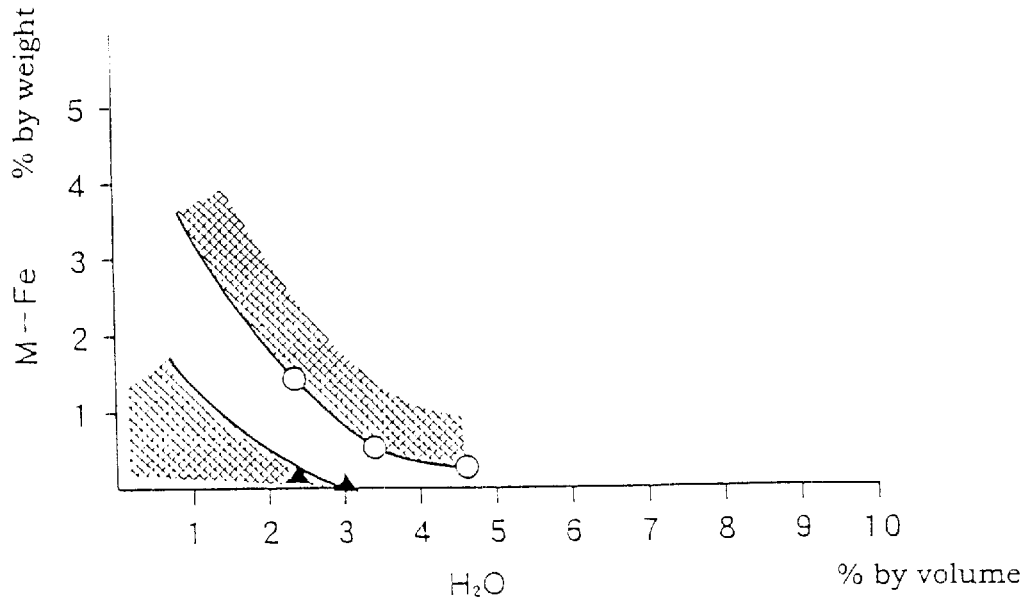
FIG. 7 is a chart representing a relationship between percent by volume of $H_2O$ in a fluidized bed reactor and percent by weight of metallic iron (M—Fe) in a product, which is exerted on the generation of the free carbon.

FIG. 7 is a chart representing a relationship among metallic iron (M—Fe) in a product, percent by volume of $H_2O$ and the status of generation of free carbon, in the case where iron ore having the above-mentioned composition and particle size has been converted into iron carbide ($Fe_3C$) using a reaction gas having the above-mentioned composition at a temperature of 590 to 650° C. and a pressure of 3 to 4 $kgf/cm^2$ G in fluidized bed reactor 1. In FIG. 7, mark 'O' and mark '▲' have the same meanings as in FIG. 6. As is apparent from FIG. 7, if the ratio of metallic iron (M—Fe) is reduced with the same percent by volume of $H_2O$, the free carbon is easily generated. The reason is that the ratio of the metallic iron contained in the product is very small in the last stage of the reaction and metallic iron obtained by reducing residual iron oxide in the iron ore immediately easily tends to be converted into iron carbide. Thus, the ratio of conversion into iron carbide is excessive in the last stage of the reaction. As a result, the free carbon is easily generated. Thus, lack of the metallic iron causes the generation of the free carbon. Therefore, if the quantity of the metallic iron contained in the product can be obtained by analyzing the component of the product, the generation of the free carbon can be predicted. A gas in the vicinity of the outlet port of the fluidized bed reactor has an equilibrium relationship with a product (raw material for iron making and steel making mainly comprising iron carbide) to be discharged from the outlet port. Therefore, a gas composition in the vicinity of the outlet port is detected by a gas chromatography method, for example, thereby estimating the quantity of the metallic iron contained in the product. Thus, the generation of the free carbon can be predicted and a precise countermeasure for controlling the generation of the free carbon can be taken.

INDUSTRIAL APPLICABILITY

Since the present invention has the above-mentioned constitution, the apparatus according to the present invention is suitable for an apparatus for producing iron carbide in which free carbon is generated with difficulty.

What is claimed is:

1. A method for reducing free carbon generation by thermal decomposition of carbon monoxide or hydrocarbon when raw materials for iron making or steel making mainly comprising iron carbide as a main component is produced by reducing and carburizing iron-containing raw materials for iron making mainly comprising iron oxides and iron hydroxides as main components using a reaction gas mainly containing hydrogen and methane, comprising the steps of dividing an inside of a reactor into a plurality of compartments, detecting the presence of free carbon in the reactor by finding out a lower temperature due to an endothermic reaction by means of a thermometer installed in a latter half of the compartments which are closer to an outlet port for product, and changing a composition of the reaction gas corresponding to a quantity of detected free carbon indicated by said temperature to reduce free carbon generation in said reactor.

* * * * *